Patented Oct. 16, 1951

2,571,208

UNITED STATES PATENT OFFICE 2,571,208

MANUFACTURE OF 1,2-EPOXYCYCLOOCTANE

Louis Elwood Craig, Washington, N. J., assignor to General Aniline & Film Corporation, New York, N. Y., a corporation of Delaware No Drawing. Application December 17, 1949, Serial No. 133,669

4 Claims. (Cl. 260—348.5)

This invention relates to an improved process for the preparation of 1,2-epoxycyclooctane.

1,2-epoxycyclooctane is a useful intermediate for the preparation of various derivatives of cyclooctane, by reason of the reactivity of the epoxy radical toward other compounds, especially those containing reactive hydrogen atoms.

1,2-epoxycyclooctane was prepared heretofore by reaction of cyclooctene with perbenzoic acid (Godchot et al., Comptes Rend. 192, 1931, page 262; Reppe et al., Annalen 560, 1948, page 40). Perbenzoic acid is, however, an expensive reagent, and separation of the benzoic acid produced from the desired reaction product complicates its use for preparing the desired product. Anhydrous peracetic acid has also been used for epoxidation of various olefins, including cyclic olefins, but this reagent is likewise too expensive for commercial use, particularly since acetic anhydride employed in its production is converted during use to aqueous acetic acid which can only be reconverted to the anhydride at considerable cost. Moreover, anhydrous peracetic acid tends to produce explosive mixtures, resulting in a substantial safety hazard.

According to U. S. P. 2,458,484 to Terry et al., higher fatty acids, or their esters of amides, in which the fatty chain contains an olefinic double bond, can be epoxidized by treatment at 25–45° C. with a solution of peracetic acid in aqueous acetic acid, prepared, for example, from 30% hydrogen peroxide, glacial acetic acid, and a catalytic amount of sulfuric acid. There is no suggestion in this patent that this reagent could be applied generally for epoxidation of olefinic compounds, particularly cyclic olefins lacking the carboxylic functions and the straight-chain structure of the fatty acids or their aforesaid derivatives.

I have discovered that cyclooctene can be readily converted to 1,2-epoxycyclooctane in good yields by reaction with a solution of peracetic acid in aqueous acetic acid, including as much as 20% water, prepared, for example, by reaction of excess glacial acetic acid with 30% (or stronger) aqueous hydrogen peroxide in the presence of a catalyst such as concentrated sulfuric acid.

The epoxidation is effected advantageously at temperatures not substantially higher than 20° C. (e. g. from 0 to 20° C.), and requires no agitation after the reagents are initially mixed. When all of the cyclooctene dissolves in the peroxide mixture, reaction is complete, such completion being attained within a few hours. The 1,2-epoxycyclooctane produced can be separated from the reaction mixture by extraction with a volatile hydrocarbon solvent such as petroleum ether, and the solvent subsequently evaporated from the extract to obtain a 1,2-epoxycyclooctane of sufficient purity for use in further reactions. The technical product can be purified by fractional distillation under reduced pressure to recover pure 1,2-epoxycyclooctane.

A preferred procedure in accordance with my invention is illustrated in the following examples, wherein parts and percentages are by weight.

Example 1

A solution of peracetic acid in aqueous acid was prepared by adding 75 parts of 30% hydrogen peroxide and 5 parts of concentrated sulfuric acid to 300 parts of glacial acetic acid at room temperature (about 25° C.), and allowing the mixture to stand at room temperature for 24 hours. The resulting solution contained 2.64% reactive oxygen (in the form of peracetic acid). 5 to 10 parts of sodium acetate were added to 300 parts of the aforesaid peracetic acid solution to neutralize the sulfuric acid. 44 parts of cyclooctene were added portionwise, with agitation, to the resulting aqueous peracetic acid solution, while maintaining the temperature below 20° C. The solution thereby obtained was allowed to stand at 0 to 10° C. until all of the cyclooctene dissolved in the peracetic acid solution. At the end of this period, the solution was poured into 250 parts of water, and the resulting mixture exhaustively extracted with petroleum ether. The combined extracts were dried over anhydrous sodium sulfate, and the petroleum ether removed by distillation. The high-boiling residue was fractionally distilled under reduced pressure, whereby 1,2-epoxycyclooctane was collected as a fraction distilling at 72 to 78° C. at 14 to 15 mms. of mercury (absolute pressure). 34.5 parts (69% of theory) of this product were recovered in the form of a colorless, waxlike solid melting at 46 to 50° C. Further purification by sublimation yielded a still purer product having a melting point of 53 to 54° C. A quantitative analysis of the latter product yielded the following results:

| C | H |
|---|---|
| Per cent | Per cent |
| 75.60 | 11.51 |
| 75.63 | 11.50 |

Calculated for $C_8H_{14}O$—C: 76.14%, H: 11.18%

Example 2

The procedure of Example 1 was repeated, except that the residue obtained upon distilling the petroleum ether from the petroleum ether extracts was not further purified. 43 parts (80% of theory) were obtained of a product consisting largely of epoxycyclooctane and melting at 44 to 50° C. This product was of satisfactory purity for use in further reactions to prepare other cyclooctane derivatives.

In carrying out the process of this invention, the peracetic acid solution is conveniently prepared by adding 1 part of aqueous hydrogen peroxide of not substantially less than 30% concentration to 3 to 6 parts of glacial acetic acid, containing 0.2 to 2% of $H_2SO_4$ as a catalyst, and allowing the solution to stand at temperatures from room temperature (25° C.) to 40° C. until equilibrium is substantially obtained (e. g. 12 to 24 hours at room temperatures and somewhat shorter periods at higher temperatures). The sulfuric acid is then advantageously neutralized by addition of an equivalent amount (or a small excess) of an alkali metal acetate. An alkali metal carbonate or hydroxide can be used instead of the acetate. If desired, hydrogen peroxide of a higher concentration (e. g. 30 to 90%) can be used in the foregoing procedure.

Cyclooctene is added with agitation to the resulting solution of peracetic acid in aqueous acetic acid, at a temperature not substantially higher than 20° C., advantageously in an amount corresponding to 90 to 100% of the theoretical amount required for reaction with the peracetic acid present in the solution. A mixture is formed in which epoxidation occurs, resulting in dissolution of the cyclooctene, without requiring further agitation. The reaction is thus allowed to proceed to completion at temperatures from 0 to 20° C.

The reaction product can be readily recovered from the reaction mixture in the manner illustrated in the examples, by dilution with water, and extraction of the aqueous solution with a volatile hydrocarbon solvent such as petroleum ether. Glacial acetic acid can be recovered from the aqueous portion of the diluted reaction mixture by known methods.

The hydrocarbon solvent can be removed from the extract by distillation, and the residue (which is mainly 1,2-epoxycyclooctane) can be purified by fractional distillation in vacuo.

Variations and modifications which will be obvious to those skilled in the art can be made in the foregoing procedure without departing from the scope or spirit of this invention.

I claim:

1. A process for the production of 1,2-epoxycyclooctane which comprises reacting cyclooctene at a temperature not substantially higher than 20° C. with a solution of peracetic acid in aqueous acetic acid, said solution containing up to 20% water.

2. A process for the production of 1,2-epoxycyclooctane which comprises reacting cyclooctene at a temperature not substantially higher than 20° C. with a solution of peracetic acid prepared by reacting 3 to 6 parts of glacial acetic acid with 1 part of aqueous hydrogen peroxide of a concentration not substantially less than 30%, in the presence of a catalytic amount of $H_2SO_4$, and neutralizing the sulfuric acid in the resulting solution.

3. A process for the production of 1,2-epoxycyclooctane which comprises reacting 1 part of cyclooctene at a temperature from 0 to 10° C. with about 6 parts of a peracetic acid solution prepared by reacting 1 part of 30% aqueous hydrogen peroxide with 4 parts of glacial acetic acid in the presence of 0.5 to 2% of $H_2SO_4$, and neutralizing the sulfuric acid.

4. A process as defined in claim 1, in which the epoxycyclooctane is recovered from the reaction mixture by dilution with water, and extraction with a volatile hydrocarbon solvent.

LOUIS ELWOOD CRAIG.

REFERENCES CITED

The following references are of record in the file of this patent:

UNITED STATES PATENTS

| Number | Name | Date |
|---|---|---|
| 2,458,484 | Terry | Jan. 4, 1949 |

OTHER REFERENCES

Swern: Chemical Reviews, August 1944, vol. 45, pp. 23, 24, 25.

Findley: J. Am. Chem. Soc., March 1945, pp. 412–414.